Figure 6:
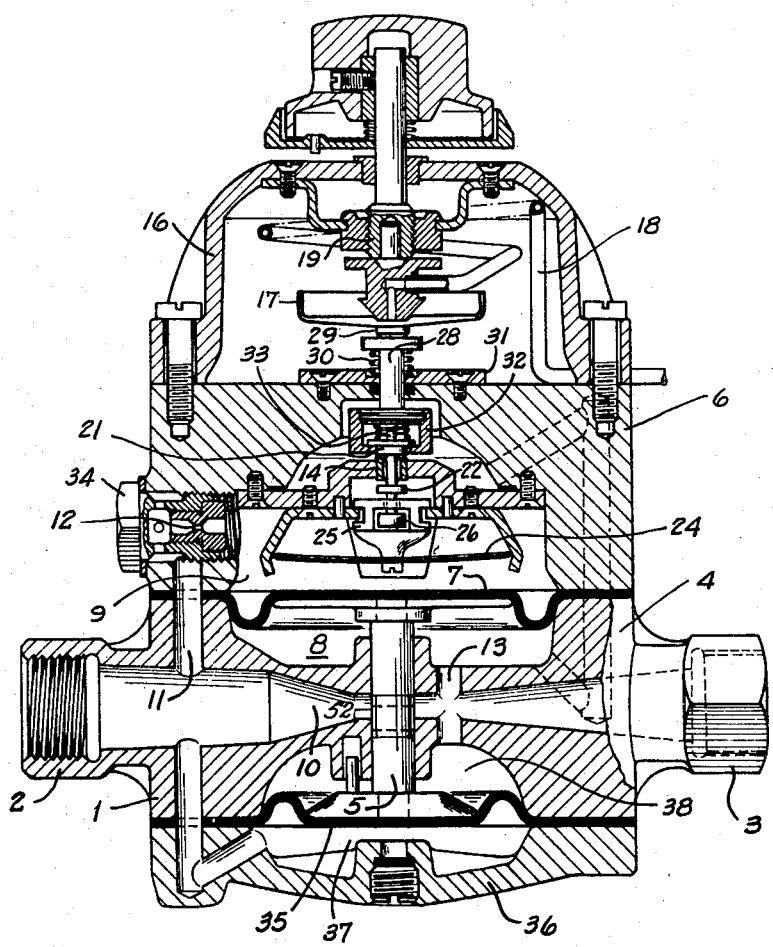

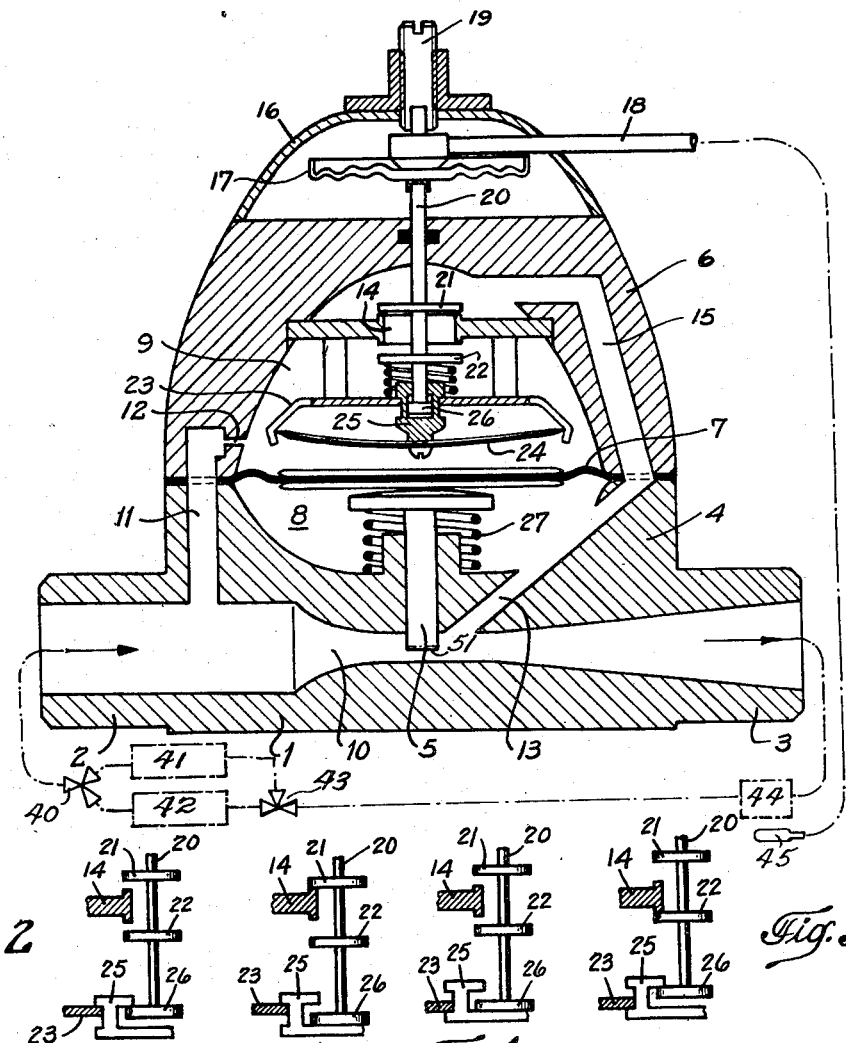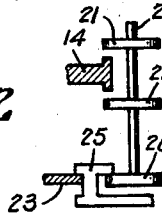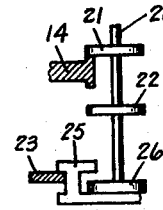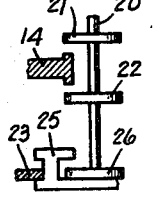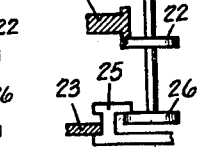

INVENTORS
WERNER BÜCHEL
PETER GRÜNBERGER

United States Patent Office 2,936,121
Patented May 10, 1960

2,936,121

THERMOSTATIC VALVE FOR AUTOMATIC HEATING OR COOLING REGULATION

Werner Büchel, Zurich, Switzerland, and Peter R. Grünberger, Cincinnati, Ohio, assignors to Landis & Gyr A.G., Zug, Switzerland, a corporation of Switzerland Application January 21, 1958, Serial No. 710,362

Claims priority, application Switzerland February 7, 1957

5 Claims. (Cl. 236—1)

Thermostatic valves are known by means of which the quantity of the heated medium flowing to the heat consumer is regulated as a function of measured temperature. The latter is in most cases established by means of a temperature sensing means, such as a liquid-filled bulb which is connected by means of a capillary tube to an expansion element, e.g. a spring bellows. The deformations of the expanding element as a function of temperature are transferred mechanically to a movable valve part. Such thermostatic check valves are designed so that when the heat requirement has been satisfied the valve closes.

Similar arrangements have been employed in cooling plants. The only difference is that the check valve in this case must allow more cooling medium to flow through to the cooling means in the room to be cooled, for which reason it is designed as an opening valve.

If a room is to be heated by using the same heat exchanger for a certain period and cooled for another period, it has been necessary, where thermostatic regulating valves are to be used, to provide both a closing valve and an opening valve. This usually means a complicated and expensive installation.

Thermostatic regulating valves have become known for the purpose indicated, which control by means of an expanding bellows or a diaphragm, as a function of an expanding temperature sensitive element, a double valve both for the purpose of heat regulation and for cooling regulation with invariable direction of control force, a part of said double valve acting as closing valve to regulate the heat and the other part of which acts as opening valve for regulating the cooling effect. In such a system, the change-over from heating to cooling regulation or vice versa is effected by hand by means of a handle, the turning of which, by means of a suitable mechanism, causes a longitudinal displacement of the movable part of the valve, the movable part of the valve being brought into the heat regulating or the cooling position. The medium for heating has a temperature of at least 30–35° C. and for cooling, a temperature of below 15–20° C., and there exists between the two types of operation a temperature difference of about 10–20° C., which is sufficient to make the reversal automatic by connecting the movable valve part to a second expansion bellows which is exposed to the temperature of the medium and shifts the movable part of the valve by means of the leap of temperature between heating and cooling, to one or the other regulating position.

Whether the valve is shifted by hand or automatically to heating or cooling operation, the known check valves of the kind mentioned have the disadvantage that the thermostatic extension member controls the other movable part of the valve, by which means either the control force or the control path is limited to a great extent and sometimes does not suffice for good regulation.

The object of the invention is to provide a servo control for a valve which is actuated by the valve control device itself and is controlled by the thermostatic expansion body. The invention provides a thermostatic heat exchange regulating valve control device for the automatic change to heating or cooling regulation with a diaphragm-box and a manually adjustable element regulating the room temperature by means of a liquid-filled temperature sensing element.

In general, the present invention provides a combined heating and cooling valve-control device or thermostat provided with a check valve having two throttle members operating simultaneously and opposite to each other, one of which is operative during heating, the other during cooling. The valve control device also includes a diaphragm-box responsive to the difference between room temperature and desired value, controlling principal valves of the medium by means of hydraulic servoforce, the servoforce being produced by decrease of pressure, its flow passage being provided with a Venturi tube and the control valve housing having a cavity divided by means of a membrane into two chambers in which there is a higher and a lower pressure respectively, thereby pressing the membrane against the fixed principal valve exposed to a counterforce and the higher-pressure chamber being connected by a by-pass to a point of high static pressure in the flow passage. The check valve is provided with two oppositely acting throttle members connected to a point of lower static pressure in the flow passage and the control of the last-named check valve is effected directly by means of the diaphragm-chamber. The counter-acting force of the principal valve may be produced by means of a spring, or preferably by means of a second membrane.

Illustrative embodiments of the invention are explained in greater detail by means of the drawing. The drawing shows in:

Figure 1 a thermostatic heat exchange regulating valve for the automatic transposition for heating and cooling in a diagrammatical sectional representation;

Figures 2–5 various positions of the check valve for heating and cooling; and in Figure 6 a preferred and illustrative embodiment of the check valve in section.

The check valve, as shown in Figure 1, is provided so as to be built into the supply line of the medium immediately before a heat exchanger and comprises the housing of the check valve which consists of three parts namely a bottom part 1, a middle housing part 6 and an upper part 16.

The bottom part 1 of the housing has an intake 2, an outlet 3, a cylindrical middle part 4 and an upper middle part 6 in the axis of which is arranged the principal valve 5 for the open and closed regulation. The principal valve is provided with a bleed channel 51. On the cylindrical middle part 4 the middle housing part 6 is supported. The middle part 4 and the middle housing part 6 form together a hollow space which is divided by means of a diaphragm 7 into two chambers, namely a subpressure chamber 8 and a superpressure chamber 9. The pressure drop for the two chambers 8 and 9 is produced in such a way that in the lower part of the housing 1 the flow passage from the inflow opening up to the principal valve 5 is tapered to form a Venturi passage 10, the superpressure chamber 9 being connected by means of a superpressure channel 11 by way of a fixed throttle 12 to the inflow connection 2, the subpressure chamber 8 by means of a subpressure channel 13 to the flow channel tapered behind the principal valve 5.

For the purpose of controlling the pressure drop the superpressure chamber 9 is connected by way of the control valve 14, 21, 22 operating in both directions by means of a channel 15 with the subpressure chamber 8. On the central part of the housing 6 the upper part 16 of the housing is supported and has a diaphragm-chamber 17 for the control of the check valves 14, 21, 22. The diaphragm-chamber 17 is connected by means of a capillary tube 18 to a liquid temperature sensing means on the heat exchanger. The position of the diaphragm-chamber 17 is adjustable by means of a screw 19 for the purpose of setting the desired value of the temperature. The diaphragm-chamber 17 is connected by means of a thrust rod 20 to the throttle members 21, 22 of the control valves 14, 21, 22. The control valve 14, 21, 22 is shown in the position for heat regulation. A bi-metal spring 24 is inserted in the superpressure chamber 9 on a rigidly arranged strap 23 which spring is normally bent in a downward direction when the medium is warmed and which snaps into an upward position when the medium is cooled, thus, by means of the fork 25 and the slide 26, the throttle member 22 is brought into the control position relative to the check valves 14, 21, 22 lifting the throttle member 21 out of its control position.

In Figure 1 there is schematically shown the heating means 41 and the cooling means 42 for the heat transfer medium, flow of which is controlled by the 3-way valves 40 and 43, as it is fed to and from the heat exchanger 44 and is controlled by the sensing thermal element 45.

The apparatus works as follows: when the principal valve 5 is open and hot water flows from the inlet connection 2 to the outlet connection 3 through the control valve described, the Venturi tube 10 causes a higher pressure in channel 12 than in channel 13, 15. When the room temperature sensed by the liquid filled temperature sensing bulb 45 connected to the capillary tube 18 rises, the diaphragm-chamber 17 presses the push-rod 20 in a downward direction and closes the control valve 14, 21. This produces a superpressure in chamber 9 compared to chamber 8 with the result that the diaphragm 7 presses on the main valve 5 closing the latter.

If the room temperature goes down, the diaphragm-chamber 17 opens the control valve 14, 21 with the result that the difference in pressure between the chambers 9 and 8 decreases and the main valve 5 opens again.

If the cross-section of the passage of the check valve 14, 21 is greater than that of the fixed throttle 12 the drop of pressure from channel 11 to channel 13 takes place to the greatest extent by way of the fixed throttle 12, i.e. between the chambers 9 and 8 there exist practically no difference of pressure and the main valve 5 is kept, by means of a return spring 27, in an open position. If the control valve 14, 21 is closed to such an extent as to make the cross-section of its passage smaller than that of the fixed throttle 12, a corresponding part of the total drop of pressure available over the control valve 14, 21 and therefore also over the diaphragm 7 takes place whereby the main valve 5 is closed.

The change-over from heating to cooling and vice versa by means of the bimetal snap-spring 24 is effected as follows: when the heating medium flows through the check valve, the bimetal spring 24 is bent in a downward direction and the fork 25 remains drawn in a downward direction on the yoke or strap 23. If the control valve 14, 21 is opened entirely, as shown in Figure 2, the slide 26 rests above against the fork 25 and the total opening of valves 14, 21 and 14, 22 is distributed in equal halves. Now, the diaphragm-chamber 17 is in a condition, if the room temperature is too high, to close the valve 14, 21 by pressing down the push-rod 20, in which condition the slide 26 rests in the bottom of the fork 25, as shown in Figure 3. As the cooling of the room always sets in when the room temperature is too high, the control valve is before the change-over in the position according to Figure 3.

If the installation is changed from heating to cooling, cooling medium enters the inflow connection 2; the regulator housing and the medium in the chambers 8 and 9 get cool, and when a sufficiently low temperature is reached the bi-metal spring snaps in the upward direction whereby the fork 25, pressed upwards, comes to lie on the lower side of the support 23, the slide 26 is lifted and the two valves 14, 21 and 14, 22 are opened to equal halves, as shown in Figure 4. Now if the room temperature drops the diaphragm-chamber 17 lifts the push rod 20 and closes the control valve 14, 22, in which case the slide 26 rests above in the fork 25, as shown in Figure 5.

The change-over of cooling and heating operation takes place when the room temperature is too low; at that point the control valve takes up the position shown in Figure 5. Through the reversal of the plant to heating operation heating medium gets into the inflow connection 2; the regulator housing and the medium in the chambers 8 and 9 gets heated again and at a sufficiently high temperature the bimetal spring 24 snaps again downwardly and puts the check valve again in the position shown in Figure 2.

In order to allow the automatic shifting from the heating to the cooling operation as described to take place it is necessary that with a closed main valve a small amount of medium can flow through the flow channel, as the main valve operates with a slight leak, or that a non-closable trench 51 or the like be arranged.

Also the push rod 20 between the diaphragm-chamber 17 and the throttle member 21 is preferably not rigid, as shown for the sake of simplicity in a diagrammatical manner in Figure 1, but transfer members must be built in which take up the lift produced between the throttle member 21 and the diaphragm-chamber 17 by the snap of the bimetal spring 24 so that the diaphragm chamber 17 be not influenced by this lift.

Figure 6 shows a section of a preferred embodiment of the subject matter of the invention and exhibits the preferred detail arrangements. The reference characters, as far as they are the same, are taken over from Figure 1.

The transfer of the lift of diaphragm-chamber 17 to the control valve is effected by means of a plunger 28 on which the diaphragm-chamber 17 presses with a pimple 29. A helical spring 30 between the packing plate 31 on the middle part of the housing 6 and a shoulder of the plunger 28, provide the restoring force for the diaphragm-chamber 17. At the lower end of the plunger 28 a fork 32 is screwed on and the throttle member 21 is suspended under the pressure of a spring 33 in said fork 32. Main valve 5 is provided with bleed groove 52.

If during the change-over of heating to cooling the throttle member 21 is lifted when the bimetal spring 24 snaps up this lift is taken up by the fork 32, the spring being compressed and the edge of the throttle member 21 being lifted from the fork 32. Then if the room temperature falls the diaphragm-chamber 17 is raised and therewith the stamp 28 and the fork 32 until the play is cancelled again.

If then the room temperature is further cooled the diaphragm-chamber 17 is lifted and with it the plunger 28 still further and closes the valve 14, 22. In a change-over of cooling to heating, when the adjusting spring 24 snaps downwards, the fork 32 and the plunger 28 are drawn downwards so that the button 29 is lifted from the stamp 28 until the diaphragm-chamber 17 is lowered again by the increase in room temperature pressing the button 29 again on the plunger 28.

When the pressure of the circulating pump is constant the counterforce at the main valve may be a helical spring, as shown in Figure 1. As the pump pressure may be very different in various plants it is advisable to make also the counterforce of the main valve 5 dependent on the pressure of the medium. This is accomplished in a simple manner, as shown in Figure 6, by means of a diaphragm 7 acting against diaphragm 35, which is arranged between the lower part of the housing 1 and a bottom plate 36, in which case the bottom plate 36 forms an overpressure chamber 37 and the lower part of the housing 1 an under-pressure chamber.

The check valve operates preferably as an open-closed regulator. This is disadvantageous only in the case when the open-closed regulation takes place too slowly, causing a noticeable fluctuation of the room temperature. To prevent the room temperature from varying noticeably it is necessary to produce the opening and closing regulation with sufficient rapidity. This may be attained in the manner known by an arrangement in which the diaphragm-chamber 17 depends not only on one liquid temperature feeler but on several of these feelers. A suitable arrangement consists in that two liquid temperature feelers are used and in such a manner that they respond to the temperature of the air of the room at the entrance and exit of the heat exchanger.

The invention in its broader aspects is not limited to the specific mechanisms shown and described but departures may be made therefrom within the scope of the accompanying claims without departing from the principles of the invention and without sacrificing its chief advantages.

What is claimed is:

1. An automatic change-over valve control device for the thermostatic regulation of a heating and cooling heat exchanger to which a heat transfer medium is supplied comprising in combination a housing, a diaphragm dividing said housing into two chambers, means forming a Venturi passage in said housing through which a heat transfer fluid is supplied to the exchanger, a normally open regulating valve arranged to regulate the flow of fluid through said Venturi passage, means interconnecting the regulating valve and diaphragm whereby the valve is closable by said diaphragm, means forming a channel connecting one chamber to a point of high static pressure in the Venturi passage to force the diaphragm towards valve closing position, a double-acting throttle valve having two closed positions and an intermediate variable open position, means forming another channel which connects with the other chamber and with a point of low static pressure in the Venturi passage, means forming a communication between said double acting valve and said other channel, means controlled by a decrease in the temperature of the fluid flowing through the normally open regulating valve for shifting the double-acting throttle valve from a normally closed to a normally open position to provide a change-over from heating regulation to cooling regulation, a diaphragm box forming an expansion member and an external liquid-filled temperature sensing element connected to said diaphragm box, said diaphragm box actuating said double-acting throttle valve in accordance with the sensed external temperature of said temperature sensing element.

2. A valve control device as claimed in claim 1 in which said means for shifting the throttle valve for the change-over from the heating to the cooling regulation is a temperature actuated snap spring.

3. A valve control device as claimed in claim 1 in which the normally open valve has spring means balanced against pressure exerted by the diaphragm to open the valve.

4. A valve control device as claimed in claim 3 in which said means for shifting the throttle valve is a temperature actuated snap spring means that biases the double acting throttle valve to a normally open, or a normally closed position and the snap spring means is positioned within one chamber and is in contact with the fluid in said chamber.

5. A valve control device as claimed in claim 1 in which the regulating and throttle valves are coaxially mounted on actuating members movable along their axes for opening and closing movement, said valves being on opposite sides of said diaphragm, said diaphragm being positioned for direct actuation of said valve actuating members.

References Cited in the file of this patent

UNITED STATES PATENTS

| | | |
|---|---|---|
| 2,207,978 | Gauger | July 16, 1940 |
| 2,419,820 | Chandler | Apr. 29, 1947 |
| 2,583,006 | Niesemann | Jan. 22, 1952 |
| 2,599,175 | Heitchue | June 3, 1952 |
| 2,631,781 | Dillman | Mar. 17, 1953 |
| 2,776,796 | Mosely | Jan. 8, 1957 |
| 2,835,446 | Dillman | May 20, 1958 |